(12) United States Patent
Ogasawara et al.

(10) Patent No.: US 7,622,168 B2
(45) Date of Patent: Nov. 24, 2009

(54) POLARIZING PLATE WITH PRESSURE-SENSITIVE ADHESIVE TYPE OPTICAL COMPENSATION LAYER AND IMAGE DISPLAY

(75) Inventors: Akiko Ogasawara, Ibaraki (JP); Masayuki Satake, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 338 days.

(21) Appl. No.: 10/543,297

(22) PCT Filed: Jan. 26, 2004

(86) PCT No.: PCT/JP2004/000636

§ 371 (c)(1), (2), (4) Date: Jul. 26, 2005

(87) PCT Pub. No.: WO2004/068201

PCT Pub. Date: Aug. 12, 2004

(65) Prior Publication Data

US 2006/0127606 A1 Jun. 15, 2006

(30) Foreign Application Priority Data

Jan. 27, 2003 (JP) .............................. 2003-017138

(51) Int. Cl.
*G02F 1/1333* (2006.01)

(52) U.S. Cl. .............................. 428/1.31; 428/355 AC; 349/96; 349/122

(58) Field of Classification Search .................. 428/1.3, 428/355 R, 355 AC, 1.31; 524/558; 349/96, 349/102, 117, 122

See application file for complete search history.

(56) References Cited

U.S. PATENT DOCUMENTS 5,795,650 A * 8/1998 Watanabe et al. ..... 428/355 AC (Continued)

FOREIGN PATENT DOCUMENTS

JP 2001-264538 A 9/2001

(Continued)

OTHER PUBLICATIONS

Merriam-Webster's Online Dictionary, Definition of Laminate, Retrieved Feb. 16, 2009, from the website <ahref="http://www.merriam-webster.com/dictionary/laminate">laminate</a>.*

(Continued)

*Primary Examiner*—David R Sample
*Assistant Examiner*—Sophie Hon
(74) *Attorney, Agent, or Firm*—Knobbe Martens Olson & Bear LLP

(57) ABSTRACT

The present invention relates to a polarizing plate with pressure-sensitive adhesive type optical compensation layer, comprising a polarizing plate with optical compensation layer (1) and an optical compensation film (2) bonded to each other via a pressure-sensitive adhesive layer A, and a pressure-sensitive adhesive layer B at the opposite side of the optical compensation film (2) to the pressure-sensitive adhesive layer A, wherein both the pressure-sensitive adhesive layers A and B have a tensile elasticity of 0.1 MPa or less at 23° C. This polarizing plate with pressure-sensitive adhesive type optical compensation layer is capable of minimizing display irregularity even when placed in a high-temperature or high-temperature and high-humidity atmosphere.

17 Claims, 1 Drawing Sheet

U.S. PATENT DOCUMENTS

| | | | | |
|---|---|---|---|---|
| 5,852,119 | A * | 12/1998 | Kojima et al. | 525/123 |
| 6,331,882 | B1 * | 12/2001 | Shimodaira et al. | 349/122 |
| 6,417,892 | B1 * | 7/2002 | Sharp et al. | 348/742 |
| 6,524,701 | B1 * | 2/2003 | Kondo et al. | 428/355 RA |
| 2001/0031835 | A1 * | 10/2001 | Ohrui et al. | 525/329.7 |
| 2001/0041763 | A1 * | 11/2001 | Suzuki et al. | 524/323 |
| 2002/0018162 | A1 * | 2/2002 | Suzuki et al. | 349/117 |
| 2002/0035177 | A1 | 3/2002 | Kishioka et al. | |
| 2002/0169267 | A1 * | 11/2002 | Minakuchi et al. | 526/282 |
| 2003/0151705 | A1 | 8/2003 | Saiki et al. | |

FOREIGN PATENT DOCUMENTS

| | | |
|---|---|---|
| JP | 2001-272542 A | 10/2001 |
| JP | 2002-258052 A | 9/2002 |

OTHER PUBLICATIONS

Chinese Office Action issued on the corresponding Chinese Patent Application No. 200480002498.X, dated Dec. 15, 2006.

* cited by examiner

POLARIZING PLATE WITH PRESSURE-SENSITIVE ADHESIVE TYPE OPTICAL COMPENSATION LAYER AND IMAGE DISPLAY

This application is a U.S. National Phase under 35 U.S.C. §371 of International Application PCT/JP2004/000636, filed Jan. 26, 2004, which claims priority to Japanese Patent Application No. 2003-017138, filed Jan. 27, 2003. The International Application was not published under PCT Article 21(2) in English.

TECHNICAL FIELD

The present invention relates to a polarizing plate with pressure-sensitive adhesive type optical compensation layer. The polarizing plate with pressure-sensitive adhesive type optical compensation layer according to the present invention is useful for improving the viewing angle property of a liquid crystal display and is arranged in at least one side of a liquid crystal display panel. The polarizing plate with pressure-sensitive adhesive type optical compensation layer according to the present invention can be applied to various image displays such as organic EL, PDP etc.

BACKGROUND ART

A liquid crystal display is used widely as a display in various information processing devices. In a liquid crystal display panel in the liquid crystal display, a polarizer should be arranged for the image formation system, and generally a polarizing plate is used.

A thin film transistor-driven twisted nematic liquid crystal display (TFT-LCD) most widespread at present, when viewed in an inclined direction, shows a phenomenon of lowered contrast and reversed brightness in assign intensity level and has the viewing angle property of lowered display characteristics. To achieve a wide viewing angle with good visibility by improving this viewing angle property, a polarizing plate with optical compensation layer, comprising an optical compensation film laminated on a polarizing plate, is used. As the optical compensation film, for example, a polymer-stretched film in which a polymer is uniaxially or biaxially stretched, or a liquid crystal alignment film in which a liquid crystal polymer is aligned, is used. Lamination of a polarizing plate on an optical compensation film and subsequent adhesion of the polarizing plate with optical compensation layer onto a liquid crystal display panel are conducted usually via a pressure-sensitive adhesive layer. The polarizing plate and the optical compensation film, because of their material properties, generate a dimensional change due to shrinkage or expansion in a high-temperature or high-temperature and high-humidity environment. The polarizing plate shows a higher dimensional change. Accordingly, when the polarizing plate with optical compensation layer is applied to a liquid crystal display, the stress due to a difference in dimensional change between the polarizing plate and the optical compensation film, caused by generated heat from a backlight etc., act to the side of the optical compensation film. As a result, a liquid crystal display panel using the polarizing plate with optical compensation layer has the problem of display irregularity. To solve this problem, a polarizing plate with optical compensation layer in which the elasticity modulus of a pressure-sensitive adhesive layer laminating the optical compensation film and the polarizing plate is specified, is proposed (see, for example, JP-A No. 2001-272542).

According to the patent document, the display irregularity caused by the polarizing plate with optical compensation layer can be suppressed.

However, there is the case where the polarizing plate with optical compensation layer is used as a laminate comprising two or more optical compensation films, further laminating a optical compensation film. In this case, the dimensional change in the polarizing plate with optical compensation layer is greater than the dimensional change in the optical compensation films. Accordingly, the stress due to a difference in dimensional change between the polarizing plate with optical compensation layer and the optical compensation films act to each film, and in the mode of the pressure-sensitive adhesive layer described in the above-mentioned patent document, the display irregularity of the LCD panel cannot be sufficiently suppressed in some cases.

DISCLOSURE OF INVENTION

An object of the present invention is to provide a polarizing plate with pressure-sensitive adhesive type optical compensation layer capable of minimizing display irregularity even when placed in a high-temperature or high-temperature and high-humidity atmosphere, which comprises an optical compensation film laminated via a pressure-sensitive adhesive layer on a polarizing plate with optical compensation layer, the optical compensation film having another pressure-sensitive adhesive layer.

Another object of the present invention is to provide an image display to which the polarizing plate with pressure-sensitive adhesive type optical compensation layer is applied.

The present inventors made extensive study to solve the problem described above, and as a result, found that the above objects can be achieved by the following polarizing plate with pressure-sensitive adhesive type optical compensation layer, and the present invention was thereby completed.

That is, the present invention is related to a polarizing plate with pressure-sensitive adhesive type optical compensation layer, comprising a polarizing plate with optical compensation layer (1) and an optical compensation film (2) bonded to each other via a pressure-sensitive adhesive layer A, and a pressure-sensitive adhesive layer B at the opposite side of the optical compensation film (2) to the pressure-sensitive adhesive layer A, wherein both the pressure-sensitive adhesive layer A and the pressure-sensitive adhesive layer B have a tensile elasticity of 0.1 MPa or less at 23° C.

The polarizing plate with pressure-sensitive adhesive type optical compensation layer according to the present invention comprises the pressure-sensitive adhesive layer A and the pressure-sensitive adhesive layer B both having a tensile elasticity of 0.1 MPa or less at 23° C., and can relax stress generated due to a difference in dimensional change between the polarizing plate with optical compensation layer (1) and the optical compensation film (2), when placed in a high-temperature or high-temperature and high-humidity atmosphere. Further, the deformation of the optical compensation film (2) caused by stress generated due to a dimensional change in the polarizing plate is prevented, thus preventing occurrence of retardation. It follows that even when the polarizing plate with pressure-sensitive adhesive type optical compensation layer is applied to a liquid crystal panel etc., display irregularity can be suppressed.

As described above, the tensile elasticity of the pressure-sensitive adhesive layer A for laminating the optical compensation layer of the polarizing plate with optical compensation layer (1) and the optical compensation film (2) is 0.1 MPa or less. The tensile elasticity of the pressure-sensitive adhesive layer A is preferably 0.08 MPa or less. When the tensile elasticity of the pressure-sensitive adhesive layer A is greater than 0.1 MPa, the stress generated due to a difference in dimensional change is hardly relaxed. On the other hand, the tensile elasticity of the pressure-sensitive adhesive layer A is preferably 0.01 MPa or more, more preferably 0.03 MPa or more, from the viewpoint of preventing foaming or separation in a high-temperature or high-temperature and high-humidity atmosphere.

The tensile elasticity of the pressure-sensitive adhesive layer B arranged on the optical compensation film (2) is also 0.1 MPa or less. The tensile elasticity of the pressure-sensitive adhesive layer B is preferably 0.08 MPa or less. When the tensile elasticity of the pressure-sensitive adhesive layer B is greater than 0.1 MPa, the stress generated due to a difference in dimensional change is hardly relaxed. On the other hand, the tensile elasticity of the pressure-sensitive adhesive layer B is preferably 0.01 MPa or more, more preferably 0.03 MPa or more, from the viewpoint of preventing foaming or separation in a high-temperature or high-temperature and high-humidity atmosphere. The tensile elasticity of the pressure-sensitive adhesive layer A and the pressure-sensitive adhesive layer B is specifically a value measured by a method described in Examples.

In the polarizing plate with pressure-sensitive adhesive type optical compensation layer, the optical compensation film (2) is preferably an optical compensation film comprising a norbornene-based resin. The optical compensation film (2) using the norbornene-based resin is preferable in that it can achieve a wide viewing angle and is excellent in photo elasticity (excellent in uniformity).

In the polarizing plate with pressure-sensitive adhesive type optical compensation layer, the polarizing plate with optical compensation layer (1) is preferably a laminate of a polarizing plate and an optical compensation layer that is a liquid crystal alignment layer provided on a triacetyl cellulose film as substrate. Such polarizing plate with optical compensation layer (1) is preferable in that it is thin and can achieve a wide viewing angle.

In the polarizing plate with pressure-sensitive adhesive type optical compensation layer, the pressure-sensitive adhesive layer A and the pressure-sensitive adhesive layer B are preferably formed respectively from a crosslinked product of a composition containing an acrylic polymer having a weight-average molecular weight of 500,000 to 2,500,000 (P1), an acrylic polymer having a weight-average molecular weight of 100,000 or less (P2), and a multifunctional compound. The pressure-sensitive adhesive layers having a tensile elasticity of 0.1 MPa or less, formed from this composition, can effectively relax stress generated due to a difference in dimensional change.

The present invention also relates to an image display comprising the polarizing plate with pressure-sensitive adhesive type optical compensation layer. The pressure-sensitive optical film in the present invention is used by lamination on a glass substrate etc. in a liquid crystal panel etc., depending on the mode where various image displays such as liquid crystal displays are used.

BEST MODE FOR CARRYING OUT THE INVENTION

Figure 1:
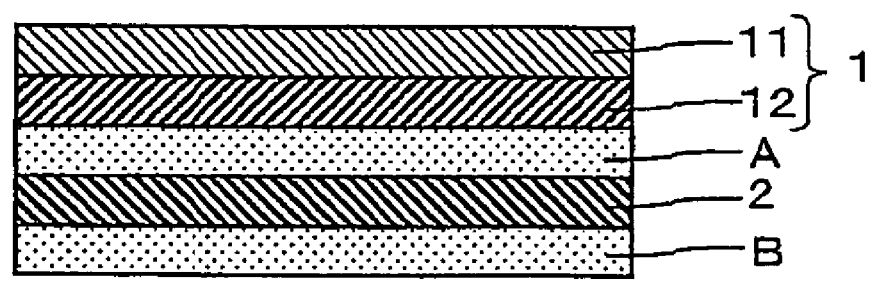
FIG. 1 is one example of a sectional view of the polarizing plate with pressure-sensitive adhesive type optical compensation layer according to the present invention.

As shown in FIG. 1, the polarizing plate with pressure-sensitive adhesive type optical compensation layer according to the present invention comprises a polarizing plate with optical compensation layer (1) and an optical compensation film (2) bonded to each other via a pressure-sensitive adhesive layer A, and a pressure-sensitive adhesive layer B at the opposite side of the optical compensation film (2) to the pressure-sensitive adhesive layer A. In the polarizing plate with optical compensation layer (1), an optical compensation film (12) is laminated on a polarizing plate (11). The surface of the polarizing plate with optical compensation layer (1), which is laminated on the pressure-sensitive adhesive layer A, is not particularly limited and may be at the side of the optical compensation layer (12) or at the side of the polarizing plate (11). As shown in FIG. 1, the surface of the polarizing plate with optical compensation layer (1), which is laminated on the pressure-sensitive adhesive layer A, is preferably at the side of the optical compensation layer (12), from the viewpoint of improving the viewing angle. A release sheet 3 can be arranged on the pressure-sensitive adhesive layer B.

In the polarizing plate (11), a polarizer is used. As the polarizing plate, the one having a transparent protective film on one or both sides of the polarizer is generally used. A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared in one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methyl-methacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent film can be formed as a cured layer made of heat curing type or ultraviolet ray curing type resins, such as acryl based, urethane based, acryl urethane based, epoxy based, and silicone based. In general, a thickness of the transparent protective film is 500 μm or less, preferably from 1 to 300 μm, and especially preferably from 5 to 200 μm.

As the transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protective film may have as little coloring as possible. Accordingly, a protective film having a phase difference value in a film thickness direction represented by $Rth=[(nx+ny)/2-nz] \times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protection film having a phase difference value (Rth) of from −90 nm to +75 nm in a thickness direction. The phase difference value (Rth) in a thickness direction is preferably from −80 nm to +60 nm, and especially preferably from −70 nm to +45 nm.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

The optical compensation layer (12) includes a retardation film, a liquid crystal alignment layer etc. The optical compensation layer (12) is usually laminated on the polarizing plate (11) via the adhesive layer or directly without the adhesive layer.

As the retardation film, a polymer film having birefringence biaxially stretched in the plane direction, a polymer film having birefringence with refractive index regulated in the thickness direction which is uniaxially stretched in the plane direction and uniaxially stretched in the thickness direction, or a biaxially stretched polymer film such as tilt alignment film, is used. The tilt alignment film is for example a film obtained by adhering a thermally shrinkable film to a polymer film and stretching and/or shrinking the polymer film under the action of the shrinkage force of the shrinkable film under heating.

The material of the retardation film includes polycarbonate, cellulose acetate, polyether ketone, polysulfone, polyester, polyvinyl alcohol, polystyrene, polymethyl methacrylate, polyallylate, polyamide, norbornene-based resin etc. A transparent polyimide film or the like can also be mentioned. The thickness of the retardation film is not particularly limited, but is preferably about 10 to 150 μm.

As the liquid crystal alignment layer, for example, the one exhibiting nematic phase, smectic phase, cholesteric phase or discotic phase as liquid crystal phase can be preferably used. These liquid crystal alignment layers include a homogeneous alignment layer, a tilt alignment layer, a hybrid alignment layer etc. The liquid crystal alignment layer is preferably the one exhibiting a discotic liquid crystal phase that is tilt-aligned. The thickness of the liquid crystal alignment layer is not particularly limited, but is preferably about 1 to 50 μm.

For example, the liquid crystal alignment layer can be formed of a polymer obtained by aligning a polymerizable liquid crystal material and fixing it by polymerization. The alignment of the polymerizable liquid crystal material is carried out by developing a solution of the polymerizable liquid crystal material on an alignment film obtained by rubbing, or by oblique deposition of silicon oxide on, the surface of a film of polyimide, polyvinyl alcohol or the like, and then thermally treating it. The polymerization method is not particularly limited, and a radical polymerization method by UV rays, or the like can be used. In the radical polymerization method by UV rays, a photopolymerization initiator is incorporated into a solution of the polymerizable liquid crystal material. The liquid crystal alignment layer can be obtained for example by tilt alignment of the liquid crystal polymer on the alignment film. A substrate forming the alignment film is not particularly limited, and a wide variety of conventionally used materials can be used. For example, the same material as in the transparent protective film used in the polarizing plate can be mentioned. When the transparent protective film is used as a substrate for forming the alignment film, the transparent protective film on which the liquid crystal alignment layer provided can be used as a transparent protective film of a polarizer in order to form the polarizing plate with optical compensation layer (1). As described above, the optical compensation layer (12) in the present invention is preferably a liquid crystal alignment layer provided on a triacetyl cellulose film as substrate.

On the other hand, the optical compensation film (2) can also be exemplified by the same retardation film and liquid crystal alignment film as in the optical compensation layer (12). Among these films, a retardation film that is a stretched polymer material is preferable. Particularly, a retardation film comprising a norbornene-based resin is preferable. The retardation film comprising a norbornene-based resin is preferably the one prepared by uniform stretching.

The pressure-sensitive adhesive used in the pressure-sensitive adhesive layer A and the pressure-sensitive adhesive layer B is not particularly limited insofar as it has the tensile elasticity described above. Examples thereof include rubber-based pressure-sensitive adhesives, acrylic pressure-sensitive adhesives, silicone-based pressure-sensitive adhesives, urethane-based pressure-sensitive adhesives, vinyl alkyl ether-based pressure-sensitive adhesives, polyvinyl alcohol-based pressure-sensitive adhesives, polyvinyl pyrrolidone-based pressure-sensitive adhesives, polyacrylamide-based pressure-sensitive adhesives, cellulose-based pressure-sensitive adhesives etc. Among these pressure-sensitive adhesives, the acrylic pressure-sensitive adhesives excellent in transparence, weatherability, heat resistance etc. is preferable. When the pressure-sensitive adhesive layer is formed as a superposed layer, layers of the same kind or different kinds of pressure-sensitive adhesives can be combined.

The acrylic pressure-sensitive adhesive contains, for example, an acrylic polymer and a multifunctional compound. The pressure-sensitive adhesive layer can be formed from a crosslinked product of such composition.

The acrylic polymer has a principle skeleton of alkyl (meth)acrylate monomer units. The (meth)acrylate means acrylate and/or methacrylate, and the term "(meth)" in the present invention has the same meaning. An average carbon number of alkyl groups of alkyl (meth)acrylates that constitute a principal skeleton of the acrylic polymer is about 1 to 12, and as examples of alkyl (meth)acrylates, there may be mentioned: methyl (meth)acrylates, ethyl (meth)acrylates, butyl (meth)acrylates, 2-ethyl hexyl (meth)acrylates, etc. These may be used independently, or may be used in combination. Among them, alkyl (meth)acrylates of alkyl groups of carbon numbers of 3 to 8 are preferable.

Above mentioned acrylic polymer preferably contains a copolymerizable monomer having a functional group reactive with the multifunctional compounds.

As monomers having the functional groups, there may be mentioned a monomer having carboxyl groups, hydroxyl groups, epoxy groups, etc. As monomers having carboxyl groups, such as acrylic acid, methacrylic acid, fumaric acid, maleic acid, itaconic acid, etc. may be mentioned. As monomers having hydroxyl groups, such as 2-hydroxy ethyl (meth)acrylate, hydroxy butyl (meth)acrylate, hydroxy hexyl (meth)acrylate, N-methylol(meth)acrylamide, etc., and as monomers having epoxy groups, such as glycidyl (meth)acrylates etc. may be mentioned.

Moreover, monomer units having N element may be introduced into the acrylic polymer. As monomers including an N element, there may be mentioned, (meth)acrylamide, N,N-dimethyl (meth)acrylamide, N,N-diethyl (meth)acrylamide, (meth)acryloyl morpholine, (meth)acetonitrile, vinyl-pyrrolidone, N-cyclohexyl maleimide, itaconimide, N,N-dimethylamino ethyl (meth)acrylamide etc. In addition, modifying monomer, such as vinyl acetate, styrene, etc. may also be further used for the acrylic polymers in a range that do not impair performance of the pressure sensitive adhesive. These monomers may be used independently or two or more kinds of them may be used in combination.

The proportion of the above-mentioned copolymerizable monomer units in the acrylic polymer is not particularly limited, but is preferably about 0.1 to 12 parts by weight, more preferably 0.5 to 10 parts by weight, relative to 100 parts by weight of the alkyl (meth)acrylate.

Although a weight-average molecular weight (measured by GPC, hereinafter same meaning) of the acrylic polymer is preferably 500,000 or more. The weight-average molecular weight of the acrylic polymer is usually about 500,000 to 2,500,000. The acrylic polymer may be manufactured using suitably selected various well-known methods, for example, radical-polymerization methods, such as a bulk polymerization method, a solution-polymerization method, and a suspension-polymerization method. As radical polymerization initiators, various kinds of well known azo based and peroxide based polymerization initiators may be used. Reaction temperatures are usually about 50 to 85° C., and reaction time is about 1 to 8 hours. Moreover, also among the manufacturing methods, a solution-polymerization method is preferable, and polar solvents, such as ethyl acetate and toluene, are generally used as solvents for acrylic polymers. Solution concentrations are usually about 20 to 80% by weight.

Moreover, the pressure sensitive adhesive composition forming the pressure sensitive adhesive layers include multifunctional compounds. As multifunctional compounds, organic crosslinking agents and multifunctional metal chelates may be mentioned. As organic based crosslinking agents, epoxy based crosslinking agents, isocyanate based crosslinking agents, imine based crosslinking agents, etc. may be mentioned. As organic based crosslinking agents, isocyanate based crosslinking agents are preferable. Multifunctional metal chelates are substances having polyvalent metals that have a coordinate bond or a covalent bond with organic compounds. As polyvalent metal atoms, Al, Cr, Zr, Co, Cu, Fe, Ni, V, Zn, In, Ca, Mg, Mn, Y, Ce, Sr, Ba, Mo, La, Sn, Ti, etc. may be mentioned. An oxygen atom etc. may be mentioned as an atom in organic compounds constituting a covalent bond or a coordinate bond, and as organic compounds, alkyl esters, alcohol compounds, carboxylic acid compounds, ether compounds, ketone compounds, etc. may be mentioned.

Although a blending ratio of the acrylic polymer and the multifunctional compound is not especially limited, but usually, preferably the multifunctional compound (solid content) is about 0.01 to 6 parts by weight to the acrylic polymer (solid content) 100 parts by weight, and more preferably 0.05 to 3 parts by weight.

Furthermore, to the pressure sensitive adhesive composition, If necessary, there may suitably be used tackifiers, plasticizers, glass fibers, glass beads, fillers comprising metal powders, other inorganic powders, etc., pigments, colorants, fillers, antioxidants, ultraviolet absorbers, silane coupling agents etc. Moreover, various kinds of additives in a range that does not depart from purposes of the invention may also be suitably used. A pressure sensitive adhesive layer showing light diffusibility obtained by adding micro-particles is also employable.

As the acrylic polymer, an acrylic polymer having a weight-average molecular weight of 500,000 or more (P1) is used, and simultaneously a low-viscous component can be incorporated. As the low-viscous component, a plasticizer, low-Tg resin (Tg, −25° C. or less), or an acrylic polymer having a weight-average molecular weight of 100,000 or less (P2) compatible well with the acrylic polymer (P1) is preferably used. The low-viscous component is preferably the acrylic polymer (P2). The weight-average molecular weight of the acrylic polymer (P2) is preferably 50,000 or less, more preferably 10,000 or less.

As the acrylic polymer (P2) having a weight-average molecular weight of 100,000 or less, the one having a principle skeleton comprising the same alkyl (meth)acrylate monomer units as in the acrylic polymer described above can be used, and a copolymer obtained by copolymerizing similar copolymerizable monomers can also be used. Although the amount of the acrylic polymer (P2) used is not particularly limited, the amount (solid content) of the acrylic polymer is 100 parts or less by weight, preferably in the range of 5 to 50 parts by weight, based on 100 parts by weight (solid content) of the acrylic polymer (P1).

Figure 2:
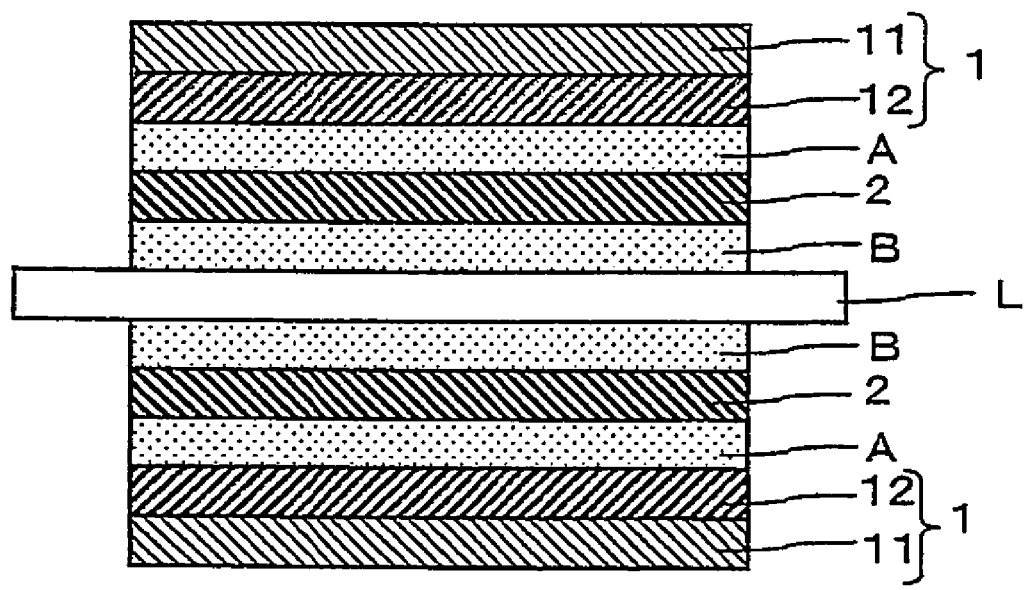
FIG. 2 is a view where the polarizing plates with pressure-sensitive adhesive type optical compensation layer are arranged in both sides of a liquid crystal cell in the Example. 1, polarizing plate with optical compensation layer; 11, polarizing plate; 12, optical compensation layer; 2, optical compensation film; A, pressure-sensitive adhesive layer A; B, pressure-sensitive adhesive layer B; and L, LCD cell.

The method of forming the pressure-sensitive adhesive layer A and the pressure-sensitive adhesive layer B Is not particularly limited, and mention is made of a method which involves applying and drying the pressure-sensitive adhesive (solution) on the polarizing plate with optical compensation layer (1) or on the optical compensation film (2), a method which involves transferring the pressure-sensitive adhesive layer via a release sheet having the layer formed thereon, etc. The application method for forming the pressure-sensitive adhesive layer can use not only a suitable development method such as a casting method, coating method etc., but also a method of irradiation treatment after application of a mixture of monomer components etc. A layer having the pressure-sensitive adhesive layers superposed therein can be formed by repeatedly carrying out an analogous method. As shown in FIG. 2, the optical compensation film (2) and the polarizing plate with optical compensation layer (1) can also be laminated via the pressure-sensitive adhesive layer on a liquid crystal display panel. The surface of the polarizing plate with optical compensation layer (1) or the optical compensation film (2) can be subjected to various kinds of surface treatment in order to improve adhesion to the pressure-sensitive adhesive layer A and the pressure-sensitive adhesive layer B. The surface treatment method is not particularly limited. The thickness (dry film thickness) of the pressure-sensitive adhesive layer A and the pressure-sensitive adhesive layer B is not particularly limited, but preferably the thickness of the pressure-sensitive adhesive layer A is about 5 to 100 µm and the thickness of the pressure-sensitive adhesive layer B is about 10 to 50 µm.

The polarizing plate with pressure-sensitive adhesive type optical compensation layer according to the present invention is arranged in at least one side of a liquid crystal display panel. Although other optical layer used in practical laminated with the polarizing plate with pressure-sensitive adhesive type optical compensation layer of the invention is especially no limitation, one layer or two layers or more of optical layers, which may be used for formation of a liquid crystal display etc., such as a reflective plate, a transreflective plate, may be used. Especially preferable are; a reflection type polarization plate or a transreflective type polarization plate in which a reflective plate or a transreflective reflective plate is further laminated onto a polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transreflective type polarizing plate may be obtained by preparing the above-mentioned reflective layer as a transreflective type reflective layer, such as a half-mirror etc. that reflects and transmits light. A transreflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarization plate. That is, the transreflective type polarization plate is useful to obtain of a liquid crystal display of the type that saves energy of light sources, such as a back light, in a well-lighted atmosphere, and can be used with a built-in light source if needed in a comparatively dark atmosphere etc.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate Is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure In which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transreflective type polarization plate is combined with above described retardation plate respectively.

Assembling of a liquid crystal display may be carried out according to conventional methods. That is, a liquid crystal display is generally manufactured by suitably assembling several parts such as a liquid crystal cell, the above-mentioned polarizing plate with pressure-sensitive adhesive type optical compensation layer and, if necessary, lighting system, and by incorporating driving circuit.

Suitable liquid crystal displays, such as liquid crystal display with which the above-mentioned polarizing plate with pressure-sensitive adhesive type optical compensation layer has been located at one side or both sides of the liquid crystal cell, and with which a backlight or a reflective plate is used for a lighting system may be manufactured. In this case, the polarizing plate with pressure-sensitive adhesive type optical compensation layer by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Hereinafter, the present invention Is described in more detail by reference to the Examples, but the present invention is not limited by the Examples. The weight-average molecular weight is a value determined by gel permeation chromatography (GPC).

(Measurement of Tensile Elasticity)

The tensile elasticity of the pressure-sensitive adhesive layer was determining by applying and laminating the pressure-sensitive adhesive layer to a thickness of 1 mm, cutting it into a piece of 5 mm×10 mm size, and obtaining a stress vs. strain curve at 23° C. under a tension speed of 300 mm/min with a distance of 10 mm between chucks in a tensile testing machine (AUTOGRAPH manufactured by Shimadzu Corporation) to determine the tensile elasticity.

Example 1

(Preparation of Pressure-Sensitive Adhesive Composition)

In an ethyl acetate solvent, 100 parts by weight of butyl acrylate, 1 part by weight of acrylic acid and 0.2 parts by weight of azobisisobutyronitrile were allowed to react at 60° C. for 7 hours, to give an acrylic polymer solution having a solids content of 30 wt %. To 100 parts by weight (polymer solid content) of the acrylic polymer solution were added 20 parts by weight of polybutyl acrylate (weight-average molecular weight, 3000; Tg, −40° C.) and 0.1 parts by weight of trimethylol propane tolylene diisocyanate (Takenate D110N manufactured by MITSUI TAKEDA CHEMICALS, INC.) and 0.1 part of a silane coupling agent (KBM-403 manufactured by Shin-Etsu Chemical Co., Ltd.), to prepare a pressure-sensitive adhesive composition. The tensile elasticity of the pressure-sensitive adhesive composition was 0.07 MPa.

(Polarizing Plate with Optical Compensation Layer)

A film obtained by stretching a polyvinyl alcohol film of 80 µm in thickness 5-times in an aqueous solution of iodine was used as a polarizer. A triacetyl cellulose film (thickness 80 µm) was adhered via an adhesive to one side of the polarizer to prepare a polarizing plate. On one hand, a triacetyl cellulose film with optical compensation layer formed of a discotic liquid crystal polymer tilt-aligned therein (thickness 110 µm) was adhered via an adhesive to the other side of the polarizer. This was used as a polarizing plate with optical compensation layer.

(Polarizing Plate with Pressure-Sensitive Adhesive Type Optical Compensation Layer)

The polarizing plate with optical compensation layer and an optical compensation film that is a stretched film of norbornene-based resin (ARTON film manufactured by JSR Corporation), were cut into pieces having a predetermined axial angle and size. As shown in FIG. 2, these were laminated in the order of the pressure-sensitive adhesive layer B/the optical compensation film (2)/the pressure-sensitive adhesive layer A/the polarizing plate with optical compensation layer (1) on both sides of a TFT-LCD cell. The polarizing plate with optical compensation layer (1) was laminated such that the optical compensation layer was at the side of the pressure-sensitive adhesive A. The above pressure-sensitive adhesive composition was used in formation of the pressure-sensitive adhesive layer A and the pressure-sensitive adhesive layer B, and the composition was applied to a thickness of 25 µm after drying.

Comparative Example 1

(Preparation of Pressure-Sensitive Adhesive Composition)

A pressure-sensitive adhesive composition was prepared in the same manner as in Example 1 except that polybutyl acrylate (weight-average molecular weight, 3000; Tg, −40° C.) was not added, and the amount of trimethylol propane tolylene diisocyanate used was changed into 0.2 parts. The tensile elasticity of the pressure-sensitive adhesive composition was 0.15 MPa.

(Polarizing Plate with Pressure-Sensitive Adhesive Type Optical Compensation Layer)

The pressure-sensitive adhesive layer B/the optical compensation film (2)/the pressure-sensitive adhesive layer A/the polarizing plate with optical compensation layer (1) were laminated in this order on both sides of a TFT-LCD cell in the same manner as in Example 1 except that the above pressure-sensitive adhesive composition was used in formation of the pressure-sensitive adhesive layer A and the pressure-sensitive adhesive layer B.

Comparative Example 2

(Polarizing Plate with Pressure-Sensitive Adhesive Type Optical Compensation Layer)

The pressure-sensitive adhesive layer B/the optical compensation film (2)/the pressure-sensitive adhesive layer A/the polarizing plate with optical compensation layer (1) were laminated in this order on both sides of a TFT-LCD cell in the same manner as in Example 1 except that the pressure-sensitive adhesive composition (tensile elasticity 0.07 MPa) prepared in Example 1 was used in formation of the pressure-sensitive adhesive layer A, and the pressure-sensitive adhesive composition (tensile elasticity 0.15 MPa) prepared in Comparative Example 1 was used in formation of the pressure-sensitive adhesive layer B.

(Evaluation)

The LCD panels obtained in Example and Comparative Examples were placed in an atmosphere of 60° C. and in a 50° C./90% RH atmosphere for 48 hours respectively. Thereafter, in-plane brightness was measured in a room-temperature atmosphere (25° C.) by a liquid crystal color distribution measuring instrument CA-1000 manufactured by Minolta Inc., to determine in-plane brightness standard derivation. Lower standard derivation is indicative of lower display irregularity. The results are shown in Table 1.

TABLE 1

| | Tensile elasticity (MPa) | | |
| --- | --- | --- | --- |
| | Pressure-sensitive adhesive layer A | Pressure-sensitive adhesive layer B | Standard deviation |
| Example 1 | 0.07 | 0.07 | 0.059 |
| Comparative Example 1 | 0.15 | 0.15 | 0.119 |
| Comparative Example 2 | 0.07 | 0.15 | 0.102 |

INDUSTRIAL APPLICABILITY

The polarizing plate with pressure-sensitive adhesive type optical compensation layer according to the present invention is useful for improving the viewing angle property of a liquid crystal display, and can be arranged on at least one side of a liquid crystal display panel. It can be applied to various image displays such as organic EL, PDP etc.

The invention claimed is:

1. A polarizing plate with pressure-sensitive adhesive type optical compensation layer used for liquid crystal display, comprising a polarizing plate with optical compensation layer (1) and an optical compensation film (2) bonded to each other via a pressure-sensitive adhesive layer A, and a pressure-sensitive adhesive layer B at the opposite side of the optical compensation film (2) to the pressure-sensitive adhesive layer A, wherein both the pressure-sensitive adhesive layer A and the pressure-sensitive adhesive layer B have a tensile elasticity of 0.1 MPa or less at 23° C., the pressure-sensitive adhesive layer A and the pressure-sensitive adhesive layer B are formed respectively from a crosslinked product of a composition containing an acrylic polymer having a weight-average molecular weight of 500,000 to 2,500,000 (P1), an acrylic polymer having a weight-average molecular weight of 100,000 or less (P2), and a multifunctional compound, and the acrylic polymer (P1) is a copolymer containing an alkyl (meth)acrylate monomer unit and 0.1 to 12 parts by weight of a copolymerizable monomer unit, relative to 100 parts by weight of the alkyl (meth)acrylate, and the acrylic polymer (P2) consists of alkyl (meth)acrylate monomer units, wherein the polarizing plate with optical compensation layer (1) is a laminate of a polarizing plate and an optical compensation layer, wherein the polarizing plate contains a polarizer and a transparent protective film on only one side of the polarizer, and the optical compensation layer is a liquid crystal alignment layer provided on a triacetyl cellulose film as substrate without an intervening adhesive layer in between.

2. The polarizing plate with pressure-sensitive adhesive type optical compensation layer used for liquid crystal display according to claim 1, wherein the optical compensation film (2) is an optical compensation film comprising a norbornene-based resin.

3. A liquid crystal display comprising the polarizing plate with pressure-sensitive adhesive type optical compensation layer according to claim 2.

4. A liquid crystal display comprising the polarizing plate with pressure-sensitive adhesive type optical compensation layer according to claim 1.

5. The liquid crystal display according to claim 4, wherein the in-plane brightness standard deviation of said liquid crystal display is maintained below 0.1 following exposure to a temperature of about 50° C. for about 48 hours under about 90% RH atmosphere.

6. The polarizing plate with pressure-sensitive adhesive type optical compensation layer used for liquid crystal display according to claim 1, wherein the weight-average molecular weight of the acrylic polymers are selected such that the pressure-sensitive adhesive type optical compensation layers A and B have a tensile elasticity of 0.1 MPa or less.

7. The polarizing plate with pressure-sensitive adhesive type optical compensation layer used for liquid crystal display according to claim 1, wherein the acrylic polymer (P2) is incorporated with the acrylic polymer (P1).

8. An adhesive-type optical compensation polarizing plate used for liquid crystal display comprising:

a laminate of a polarizing plate and an optical compensation layer;

an optical compensation film;

a pressure-sensitive adhesive layer A interposed between and bonding the laminate and the optical compensation film; and a pressure-sensitive adhesive layer B formed on a surface of the optical compensation film opposite to a surface on which the pressure-sensitive adhesive layer A is formed, wherein the pressure-sensitive adhesive layers A and B each have a tensile elasticity of 0.1 MPa or less at 23° C. and comprise a crosslinked product of a composition containing an acrylic polymer (P1) having a weight-average molecular weight of 500,000 to 2,500,000, an acrylic polymer (P2) having a weight-average molecular weight of 100,000 or less, and a multifunctional compound, the acrylic polymer (P1) is a copolymer containing an alkyl (meth)acrylate monomer unit and 0.1 to 12 parts by weight of a copolymerizable monomer unit, relative to 100 parts by weight of the alkyl (meth)acrylate, and the acrylic polymer (P2) consists of alkyl (meth)acrylate monomer units, wherein polarizing plate contains a polarizer and a transparent protective film on only one side of the polarizer, and the optical compensation layer is a liquid crystal alignment layer provided on a triacetyl cellulose film as substrate, and wherein there is no intervening adhesive layer in between the polarizing plate and the optical compensation layer.

9. The adhesive-type optical compensation polarizing plate used for liquid crystal display according to claim 8, wherein the acrylic polymer (P2) has a weight-average molecular weight of 10,000 or less.

10. The adhesive-type optical compensation polarizing plate used for liquid crystal display according to claim 8, wherein a proportion of the acrylic polymer (P2) to the crosslinked product is 5-50% by solid weight.

11. The adhesive-type optical compensation polarizing plate used for liquid crystal display according to claim 8, wherein a proportion of the multifunction compound to the crosslinked product is 1-12% by solid weight.

12. The adhesive-type optical compensation polarizing plate used for liquid crystal display according to claim 8, wherein the pressure-sensitive adhesive layers A and B have a dry film thickness of 5-100 μm and 10-50 μm, respectively.

13. The adhesive-type optical compensation polarizing plate used for liquid crystal display according to claim 8, wherein the optical compensation layer of the laminate is attached to the pressure-sensitive adhesive layer A.

14. The adhesive-type optical compensation polarizing plate used for liquid crystal display according to claim 8, wherein the optical compensation layer of the laminate is a retardation film or a liquid crystal alignment layer.

15. The adhesive-type optical compensation polarizing plate used for liquid crystal display according to claim 8, wherein the optical compensation film is an optical compensation film comprising a norbornene-based resin.

16. The adhesive-type optical compensation polarizing plate used for liquid crystal display according to claim 8, wherein the optical compensation layer of the laminate is a triacetyl cellulose film having a liquid crystal alignment layer formed thereon.

17. A liquid crystal display comprising:

a liquid crystal display panel; and the adhesive-type optical compensation polarizing plate of claim 8 formed on at lease one side of the liquid crystal display panel.

* * * * *

UNITED STATES PATENT AND TRADEMARK OFFICE
CERTIFICATE OF CORRECTION

PATENT NO. : 7,622,168 B2 Page 1 of 1
APPLICATION NO. : 10/543297
DATED : November 24, 2009
INVENTOR(S) : Ogasawara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,622,168 B2 | Page 1 of 1 |
| APPLICATION NO. | : 10/543297 | |
| DATED | : November 24, 2009 | |
| INVENTOR(S) | : Akiko Ogasawara et al. | |

It is certified that error appears in the above-identified patent and that said Letters Patent is hereby corrected as shown below:

Title Page, On Page 1, Item 56, Other Publications, please delete "Dictionary,Definition" and insert --Dictionary, Definition--, therefor.

At Column 2, Line 6, please delete "a" and insert --an--, therefor.

At Column 4, Line 40, please delete "poly-ene" and insert --polyene--, therefor.

At Column 9, Line 22, please delete "If" and insert --if--, therefor.

At Column 9, Line 54, please delete "Is" and insert --is--, therefor.

At Column 12, Line 50, please delete "Is" and insert --is--, therefor.

At Column 13, Line 7, please delete "In" and insert --in--, therefor.

At Column 13, Line 66, please delete "a" and insert --an--, therefor.

At Column 14, Line 66, please delete "Is" and insert --is--, therefor.

At Column 18, Line 63, in Claim 17, please delete "lease" and insert --least--, therefor.

Signed and Sealed this
Tenth Day of May, 2011

David J. Kappos
*Director of the United States Patent and Trademark Office*